United States Patent
Chang et al.

[11] Patent Number: 6,148,398
[45] Date of Patent: Nov. 14, 2000

[54] SETTING/DRIVING CIRCUIT FOR USE WITH AN INTEGRATED CIRCUIT LOGIC UNIT HAVING MULTI-FUNCTION PINS

[75] Inventors: Wen-Ching Chang, Yong-Ho; Lin-Hung Chang, Taipei; Nai-Shung Chang, Taipei Hsien, all of Taiwan

[73] Assignee: VIA Technologies, Inc., Taipei Hsien, Taiwan

[21] Appl. No.: 09/286,230

[22] Filed: Apr. 5, 1999

[30] Foreign Application Priority Data

Jul. 23, 1998 [TW] Taiwan .................................. 87112022

[51] Int. Cl.[7] ...................................................... G06F 9/00
[52] U.S. Cl. ................................................ 713/1; 713/100
[58] Field of Search ................................... 713/1, 2, 100, 713/501, 503

[56] References Cited

U.S. PATENT DOCUMENTS

| | | | |
|---|---|---|---|
| 4,991,085 | 2/1991 | Pleva et al. | 326/82 |
| 5,333,307 | 7/1994 | Shirk | 714/28 |
| 5,530,620 | 6/1996 | Sangveraphunsiri | 361/686 |
| 5,805,401 | 9/1998 | Schuellein et al. | 361/92 |
| 5,951,681 | 9/1999 | Chang | 713/1 |

*Primary Examiner*—Dennis M. Butler
*Attorney, Agent, or Firm*—J.C. Patents Jiawei Huang

[57] ABSTRACT

A setting/driving circuit is provided for use in conjunction with an IC logic unit, such as a CPU having one or more multi-function pins, to provide two or more sets of data, such as a set of parameter data and a set of control data, via the same multi-function pins to the CPU. The setting/driving circuit includes a tri-state buffer and a parameter setting unit composed of two resistors and a switch, such as a jumper. When the tri-state buffer is disabled, the parameter data set by the switch is transferred to the multi-function pin of the CPU. On the other hand, when the tri-state buffer is enabled, the input data to the input port of the tri-state buffer is transferred to the multi-function pin of the CPU. The tri-state buffer can be integrated within the chip set without having to increase the total number of pins on the chip set so that the layout complexity on the motherboard can be simpler and thus easier to assemble compared to the prior art. Therefore, the proposed setting/driving circuit is easier and more cost-effective to implement on a computer motherboard than the prior art.

9 Claims, 3 Drawing Sheets

SETTING/DRIVING CIRCUIT FOR USE WITH AN INTEGRATED CIRCUIT LOGIC UNIT HAVING MULTI-FUNCTION PINS

CROSS-REFERENCE TO RELATED APPLICATION

This application claims the priority benefit of Taiwan application Ser. No. 87112022, filed Jul. 23, 1998, the full disclosure of which is incorporated herein by reference.

BACKGROUND OF THE INVENTION

1. Field of the Invention

This invention relates to computers, and more particularly, to a setting/driving circuit for use in conjunction with an integrated circuit logic unit, such as a CPU having one or more multi-function pins. These pins provide two or more sets of data, such as a set of parameter data and a set of control data, via the same multi-function pins, to the CPU.

2. Description of Related Art

IBM-compatible personal computers (PC) are the most popular computer systems in the world. Earlier IBM-compatible PCs were constructed in compliance with the PC/XT and PC/AT standards. Since the IBM-compatible PCs are based on an open architecture, a great many various hardware technologies have been developed for use on them. For compatibility reasons, many new hardware technologies are integrated on the PC motherboard together with old ones. In addition, optional means, such as jumpers, are provided on the motherboard for the user to set parameters for the motherboard to operate in a user-desired manner.

The CPUs on the earliest PCs were only 4.77 MHz (megahertz) in speed, but today's high-end CPUs run at more than 400 MHz. When a new CPU is introduced, one problem encountered by this new CPU arises when it is mounted on a motherboard which is driven by a slower clock rate. In computer terminology, an internal clock rate refers to the clock rate actually used to drive the CPU, while an external clock rate refers to the clock rate used to drive the other circuit components on the motherboard. Present motherboards are typically 66 MHz or 100 MHz. Some motherboards use 75 MHz or 83 to MHz, but these are not standard types.

One solution to the problem of a high-speed CPU on a slow-speed motherboard is to multiply the motherboard clock rate to match the speed of the CPU. For instance, when a 400 MHz CPU is mounted on a 100 MHz motherboard, the 100 MHz clock rate from the motherboard is multiplied by 4 by an internal frequency multiplier in the CPU to obtain the desired 400 MHz clock rate; and when mounted on a 66 MHz motherboard, the multiplying factor is set to 6. The user can first determine the clock ratio of the internal clock rate of the CPU to the external clock rate from the motherboard by checking the specifications of the CPU and the motherboard, and then use switch means, such as jumpers, to set and input the clock ratio as parameter data to the CPU via certain pins on the CPU.

In IC manufacture, however, the total number of pins on a CPU is limited to a minimum for the purpose of making the CPU package more compact in size. Therefore, those pins that are used to receive the parameter data are typically also used for other I/O purposes after the CPU is set by the parameter data. Such pins are customarily referred to as multi-function pins. For instance, a multi-function pin may be used both for address signal output and for interrupt signal input. Typically, the parameter input to the CPU is carried out only during the initialization of the CPU; and after that, the multi-function pins used to receive the parameter data can be freed for other I/O functions during the remaining operation of the CPU.

FIG. 1 is a schematic diagram showing the use of a conventional setting/driving circuit in conjunction with a chip set 110 and a CPU 120 having a set of multi-function pins MA1, MA2, MA3, MA4. The CPU 120 also has a reset signal input pin RST (other I/O pins that are not related to the invention are not shown). The chip set 110 includes a control unit 112 having four output ports N1, N2, N3, N4 and a reset signal generator 114 having two output ports S and CPURST. The setting/driving circuit includes a set of switches 161, 162, 163, 164, such as jumpers; a set of resistors 171, 172, 173, 174; a selection circuit 130; a set of buffers 141, 142, 143, 144; and a set of resistors 151, 152, 153, 154. The selection circuit 130 has a first set of input pins A1, A2, A3, A4; a second set of input pins B1, B2, B3, B4; a set of output pins Y1, Y2, Y3, Y4; and a selection signal input pin SEL.

The chip set 110 and the CPU 120 are interconnected in such a manner that the RST input pin on the CPU 120 is connected to the CPURST output pin on the chip set 110. When the CPURST output pin is set at a low-voltage logic state, it causes the CPU 120 to be reset, whereas at a high-voltage logic state, causes the CPU 120 to operate normally. After the CPU 120 is reset, it reads the specified clock ratio setting via the multi-function pins MA1, MA2, MA3, MA4 during, for example, the first two cycles of the external clock rate from the motherboard. After this, the CPU 120 operates according to the settings to execute programs and switches the multi-function pins MA1, MA2, MA3, MA4 to a control data receiving mode to receive the control data, such as interrupt signals, from the control unit 112 in the chip set 110.

Further, a parameter setting means, which is composed of a set of switches 161, 162, 163, 164 and a set of resistors 171, 172, 173, 174, is coupled to the input pins A1, A2, A3, A4 of the selection circuit 130. The resistors 171, 172, 173, 174 each have a top end connected in common to the system voltage $V_{CC}$ and a bottom end connected to a corresponding one of the input pins A1, A2, A3, A4, while the switches 161, 162, 163, 164 each have a left end connected to the bottom end of the corresponding one of the resistors 171, 172, 173, 174 and a right end connected in common to the ground.

When any one of the switches 161, 162, 163, 164, for example the switch 161, is set to the conducting state (ON), it connects the corresponding input pin on the selection circuit 130, for example the input pin A1, to the ground, thereby setting that input pin to a low-voltage logic state, representing the input of a first logic value, for example 0, to the selection circuit 130. On the other hand, when set to a non-conducting state (OFF), it causes the corresponding input pin to be connected to the system voltage $V_{CC}$, thereby setting that input pin to a high-voltage logic state, representing the input of a second logic value, for example 1, to the selection circuit 130. In total, there are 16 different ON/OFF combinations that can be set by the four switches 161, 162, 163, 164, and therefore 16 different clock ratio settings can be input via the selection circuit 130 to the CPU 120.

The chip set 110 contains all the control functions for the selection circuit 130 and the CPU 120. The control unit 112 and the reset signal generator 114 can be either integrated on the same IC chip or on two different IC chips, preferably on the same chip to save layout area on the motherboard. The chip set 110 and the selection circuit 130 are interconnected in such a manner that the output ports N1, N2, N3 N4 on the control unit 112 are connected respectively to the input pins B1, B2, B3, B4 on the selection circuit 130, and the output port S on the reset signal generator 114 is connected to the SEL input pin on the selection circuit 130. During normal operation of the CPU 120, the selection circuit 130 is set in such a manner as to connect the input pins B1, B2, B3, B4 to the output pins Y1, Y2, Y3, Y4 thereof, so as to allow the output control data, such as interrupt signals, from the control unit 112 to be transferred to the multi-function pins MA1, MA2, MA3, MA4 on the CPU 120.

The selection circuit 130 operates in such a manner that the output pins Y1, Y2, Y3, Y4 thereof are selectively connected to either the input pins A1, A2, A3, A4 or the input pins B1, B2, B3, B4 under the control of the voltage state (called the selection signal) at the SEL input pin received from the output port S of the reset signal generator 114 in the chip set 110. For instance, when the SEL input pin receives a low-voltage logic signal, it causes the selection circuit 130 to connect the output pins Y1, Y2, Y3, Y4 to the input pins A1, A2, A3, A4, thus allowing the parameter data set by the switches 161, 162, 163, 164 to be transferred to the multi-function pins MA1, MA2, MA3, MA4 on the CPU 120.

On the other hand, when a high-voltage logic signal is received, it causes the selection circuit 130 to connect the output pins Y1, Y2, Y3, Y4 to the input pins B1, B2, B3, B4, thus allowing the control data from the control unit 112 in the chip set 110 to be transferred to the multi-function pins MA1, MA2, MA3, MA4 on the CPU 120. In some cases, the chip set 110 and the CPU 120 may have different specifications in logic signal format. For instance the chip set 110 may be designed to handle logic signals between 0 V and 3.3 V, while the CPU 120 may be designed to handle logic signals between 0 V and 2.5 V. In this case, the first system voltage $V_{CC}$ in FIG. 1 is set to 3.3 V and the second system voltage $V_t$ is set to 2.5 V. The output logic signals from the output pins Y1, Y2, Y3, Y4 on the selection circuit 130, whether the parameter data from the switches 161, 162, 163, 164 or the control data from the control unit 112, are all encoded in 3.3 V format.

The purpose of the buffers 141, 142, 143, 144 and the resistors 151, 152, 153, 154 is therefore to convert the 3.3 V logic signals into 2.5 V format so that they can be handled by the CPU 120. The buffers 141, 142, 143, 144 are each of the type having an open-collector output characteristic that allows $V_t$ to be transferred to the multi-function pins MA1, MA2, MA3, MA4 when the input logic signals to the buffers 141, 142, 143, 144 are at the high-voltage logic state of 3.3 V, and 0 V to be transferred to the same when the input logic signals to the buffers 141, 142, 143, 144 are at the low-voltage logic state of 0 V.

As mentioned earlier, the CPU 120 needs to receive the specified clock ratio setting only during the initialization stage; and after that, the multi-function pins MA1, MA2, MA3, MA4 can be freed for other I/O functions all the time during the operation of the CPU 120. When the CPU 120 is reset, the reset signal generator 114 issues a reset signal from its CPURST output pin and then transfers this reset signal to the RST input pin on the CPU 120, and concurrently a selection signal is sent from its S output pin to the SEL input pin of the selection circuit 130.

FIG. 2 is a waveform diagram showing the timing relationships between the logic state at the CPURST output pin (the reset signal) and the logic state at the S output pin (the selection signal) of the reset signal generator 114. Normally, the CPURST and S output pins are both set at a high-voltage logic state. To reset the CPU 120, the reset signal generator 114 puts the CPURST output pin at the low-voltage logic state, and meanwhile also puts the S output pin also at low-voltage logic state.

The former condition resets the CPU 120 and also switches the multi-function pins MA1, MA2, MA3, MA4 to a parameter receiving mode, while the latter condition causes the selection circuit 130 to select and transfer the input data at the input pins A1, A2, A3, A4 (i.e., the parameter data from the switches 161, 162, 163, 164) from the output pins Y1, Y2, Y3, Y4 to the multi-function pins MA1, MA2, MA3, MA4 of the CPU 120. The parameter data are therefore input to the CPU 120 via the multi-function pins MA1, MA2, MA3, MA4. After this is completed, the voltage state at the CPURST output pin is switched back to high-voltage logic state, but the voltage state at the S output pin remains at the low-voltage logic state for a predetermined delay time DT to assure that the parameter data can be faithfully received by the CPU 120. The length of the delay time DT is dependent on the speed rating of the CPU 120.

In the case of a 400 MHz CPU, for example, the delay time DT is equal to two cycles of the external clock rate of the motherboard. At the end of the delay time DT, the voltage state at the S output pin is switched back to high-voltage logic state, which then causes the selection circuit 130 to select and transfer the input data at the input pins B1, B2, B3, B4 (i.e. the control data from the control unit 112) from the output pins Y1, Y2, Y3, Y4 to the multi-function pins MA1, MA2, MA3, MA4 of the CPU 120.

FIG. 3 is a schematic diagram showing a more detailed structure of the setting/driving circuit shown in FIG. 1, but the overall system is simplified to facilitate easy explanation of the operation of the setting/driving circuit. The CPU and the chip set shown in FIG. 1 are here designated respectively by the reference numerals 320 and 310, and the control unit and the reset signal generator included in the chip set 310 are respectively designated by the reference numerals 312 and 314. Although labeled with different reference numerals, these elements are functionally identical to those shown in FIG. 1. Since all the bits of the parameter data from the switches 161, 162, 163, 164 and the resistors 171, 172, 173, 174 shown in FIG. 1 are identical in operation, the simplified diagram of FIG. 3 shows only one switch and one resistor, as here designated respectively by the reference numerals 360, 370. Similarly, only one multi-function pin, designated by MA, is shown on the CPU 120, and only one buffer 340 and one resistor 350 are shown. Further, only one output pin A is shown on the control unit 312.

The selection circuit 130 shown in FIG. 1 can be realized by the combination of a first tri-state buffer 331, a second tri-state buffer 332, and an inverter 335 as shown in FIG. 3. The first tri-state buffer 331 has a gate G1 connected via the inverter 335 to the S output pin on the reset signal generator 314 in the chip set 310, while the second tristate buffer 332 has a gate G2 connected directly to the same. The first tri-state buffer 331 operates in such a manner that when the gate G1 is set at a high-voltage logic state by the reset signal generator 314, it is enabled to cause its output to take on its input.

When at a low-voltage logic state, it is disabled to put its output at a high-impedance state (also called a floating state). The second tri-state buffer 332 operates in a similar manner. Therefore, when the reset signal generator 314 sets its S output pin at a high-voltage logic state, it causes the first tri-state buffer 331 to be disabled (since the logic state is inverted by the inverter 335) and the second tri-state buffer 332 to be enabled, thus allowing the second tri-state buffer 332 to transfer the control data from the output pin A of the control unit 312 via the buffer 350 to the multi-function pin MA of the CPU 320.

On the other hand, when the reset signal generator 314 sets its output pin S at a low-voltage logic state, it causes the first tri-state buffer 331 to be enabled (since the logic state is inverted by the inverter 335) and the second tri-state buffer 332 to be disabled, thus allowing the first tri-state buffer 331 to transfer the parameter data set by the switch 360 via the buffer 350 to the multi-function pin MA of the CPU 320.

One drawback to the foregoing setting/driving circuit, however, is that it is conventionally provided as a separate unit outside the chip set 110 since integrating it into the chip set 110 requires the chip set 110 to be provided with an increased number of pins, which would make the chip set 110 less compact in size. It is furthermore difficult and thus laborious to mount all the constituent elements of the setting/driving circuit as individual circuit components on the motherboard. The assembly of the setting/driving circuit on the motherboard is highly laborious and implementation requires a large layout area on the motherboard. The use of the conventional setting/driving circuit is therefore very cost-ineffective. There exists, therefore, a need in the computer industry for an improved setting/driving circuit that can help reduce the total number of IC units on the motherboard and also can help reduce the overall circuit complexity of the motherboard so as to allow easy and cost-effective implementation of the setting/driving circuit on the motherboard.

SUMMARY OF THE INVENTION

It is therefore an objective of the present invention to provide a setting/driving circuit for use in conjunction with a CPU having at least one multi-function pin, whose driving circuit can be integrated into the chip set without having to increase the total number of pins on the chip set. This allows the layout complexity on the motherboard simpler than that of the prior art, further allowing easy and cost-effective implementation of the setting/driving circuit on the motherboard.

In accordance with the foregoing and other objectives of the present invention, a setting/driving circuit is provided. The setting/driving circuit of the invention is designed for use in conjunction with an IC logic unit, such as a CPU, having at least one multi-function pin to provide two or more sets of data, such as parameter data and control data, via the same multi-function pin to the IC logic unit.

The setting/driving circuit of the invention comprises a tri-state buffer having an input port connected to receive the control data, an output port connected to the multi-function pin of the IC logic unit, and a control port used to receive a selection signal. The tri-state buffer operates in such a manner that when the selection signal is at an enable state, the tri-state buffer is enabled to cause the voltage state at the output port thereof to take on the voltage state at the input port thereof; and when the selection signal is at a disable state, the tri-state buffer is disabled to cause the output port thereof to be put into a high-impedance state. Moreover, the setting/driving circuit includes a first resistor having a first end connected to the system voltage and a second end connected to the output port of the tri-state buffer; a second resistor having a first end connected to the ground and a second end connected to a node; and a switch, such as a jumper, having a first end connected to the output port of the tri-state buffer and a second end connected to the node connected to the second resistor. The first and second resistors are set to such resistance values that allow them to divide the system voltage into a level below the threshold voltage of the IC logic unit to represent a low-voltage logic state.

With the foregoing setting/driving circuit, when the selection signal is switched to the disable state, the tri-state buffer is disabled to cause the output port thereof to be put into high-impedance state, allowing the parameter data set by the switch to be input to the IC logic unit via the multi-function pin. On the other hand, when the selection signal is switched to the enable state, the tri-state buffer is enabled to cause the output port thereof to take on the control data input at the input port thereof, allowing the control data to be input to the IC logic unit via the multi-function pin.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 4:
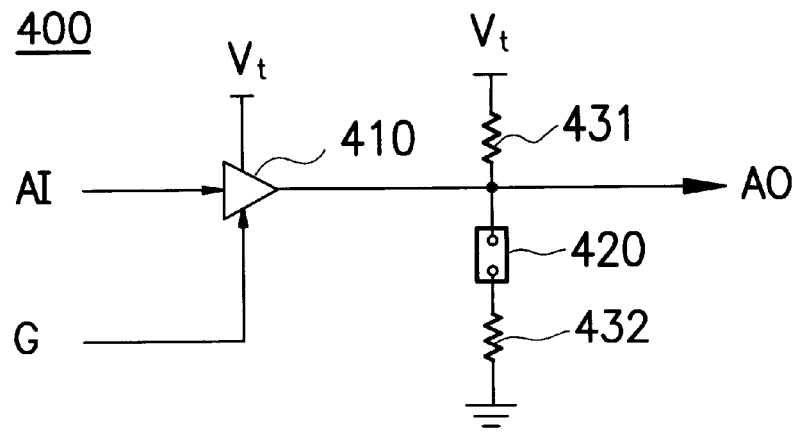
FIG. 4 is a schematic diagram of the setting/driving circuit of the invention.

FIG. 4 is a schematic diagram of the setting/driving circuit according to the invention for use with a multi-function pin. As shown, the setting/driving circuit of the invention includes a tri-state buffer 410, a switch 420, a first resistor 431, and a second resistor 432. The tri-state buffer 410 serves as a driving circuit; while the switch 420, the first resistor 43 1, and the second resistor 432 in combination constitute a parameter setting circuit. It is to be understood that the setting/driving circuit of FIG. 4 includes only one switch, i.e. the switch 420, which allows the user to set one-bit parameter data. However, in practice when a set of multiple-bit parameter data is to be used, the setting/driving circuit of FIG. 4 can be arranged in multiples in an array.

The tri-state buffer 410 has an input port AI, an output port AO, and a control port G, and is connected to a system voltage $V_t$. In this embodiment, it is assumed that $V_t$=2.5 V. The first resistor 431 has one end connected to the system voltage $V_t$ and the other end connected to the output port AO of the tri-state buffer 410. The second resistor 432 is connected in series with the switch 420, with the other end of the second resistor 432 being connected to the ground. The other end of the switch 420 is connected to the output port AO of the tri-state buffer 410. The tri-state buffer 410 operates in such a manner that when the control port G is set at a high-voltage logic state, the tri-state buffer 410 is enabled to cause the output signal AO to take on the input signal AI; and whereas, when set at a low-voltage logic state, the tri-state buffer 410 is disabled to cause the output port AO to be put into a high-impedance state (also called a floating state).

The setting/driving circuit operates in such a manner that when the tri-state buffer 410 is disabled, the output port AO is put into a high-impedance state. The output of the setting/driving circuit is dependent on the ON/OFF state of the switch 420. If the switch 420 is set to the OFF state, the output of the setting/driving circuit takes on the system voltage $V_t$ via the first resistor 431, thus representing the output of a high-voltage logic signal. On the other hand, if set to the ON state, the output of the setting/driving circuit is a specified fraction of the system voltage $V_t$ divided by the first and second resistors 431, 432. Fundamentally, a logic circuit determines the logic value of a voltage state as 0 or 1 by comparing the voltage state to a threshold voltage. If below the threshold voltage, the voltage state is taken as a low-voltage logic state to represent a first logic value, for example, 0, and if above the threshold voltage, the voltage state is taken as a high-voltage logic state to represent a second logic value, for example, 1.

In the case of the Pentium II CPU from Intel Corporation, the threshold voltage is set at 0.7 V by specification. Therefore, to use the setting/driving circuit in conjunction with this kind of CPU, the resistance values of the first and second resistors 431, 432 are given in such a manner as to divide the system voltage $V_t$ into a level below the threshold voltage of the CPU to represent a low-voltage logic state. For the Pentium II CPU operating with a 0.7 V threshold voltage and a 2.5 V system voltage, the first and second resistors 431, 432 can be, for example, 10 kΩ (kilohm) and 2 kΩ respectively. Under the condition of the tri-state buffer 410 being disabled and the switch 420 being set to ON state, the 10 kΩ and 2 kΩ resistors allow the voltage $V_{AO}$ at the node between the first resistor 431 and the switch 420 to be as follows:

$$V_{AO}=2.5*2k/10k+2k$$
$$=0.4\ V$$

which is below 0.7 V, so that it represents the output of a low-voltage logic state (i.e., a data bit 0).

Moreover, the resistance values of the first and second resistors 431, 432 should be large enough to fall within the output driving range of the tri-state buffer 410 so as to allow the tri-state buffer 410, when enabled, to output data at the output port AO. The switch 420 can be a jumper, a toggle switch, a software-controllable electronic switch, or any of various other kinds of switches.

As mentioned earlier, in the case of using a 3.3 V chip set and a 2.5 V CPU on the same motherboard, the control data from the chip set should be converted to a logic signal format before they can be received and handled by the CPU. Therefore, in the setting/driving circuit of FIG. 4, the tri-state buffer 410 is also designed to use the same system voltage $V_t$ that is connected to the first resistor 431 to represent the high-voltage logic state of the output logic signal from the output of the setting/driving circuit.

Figure 5:
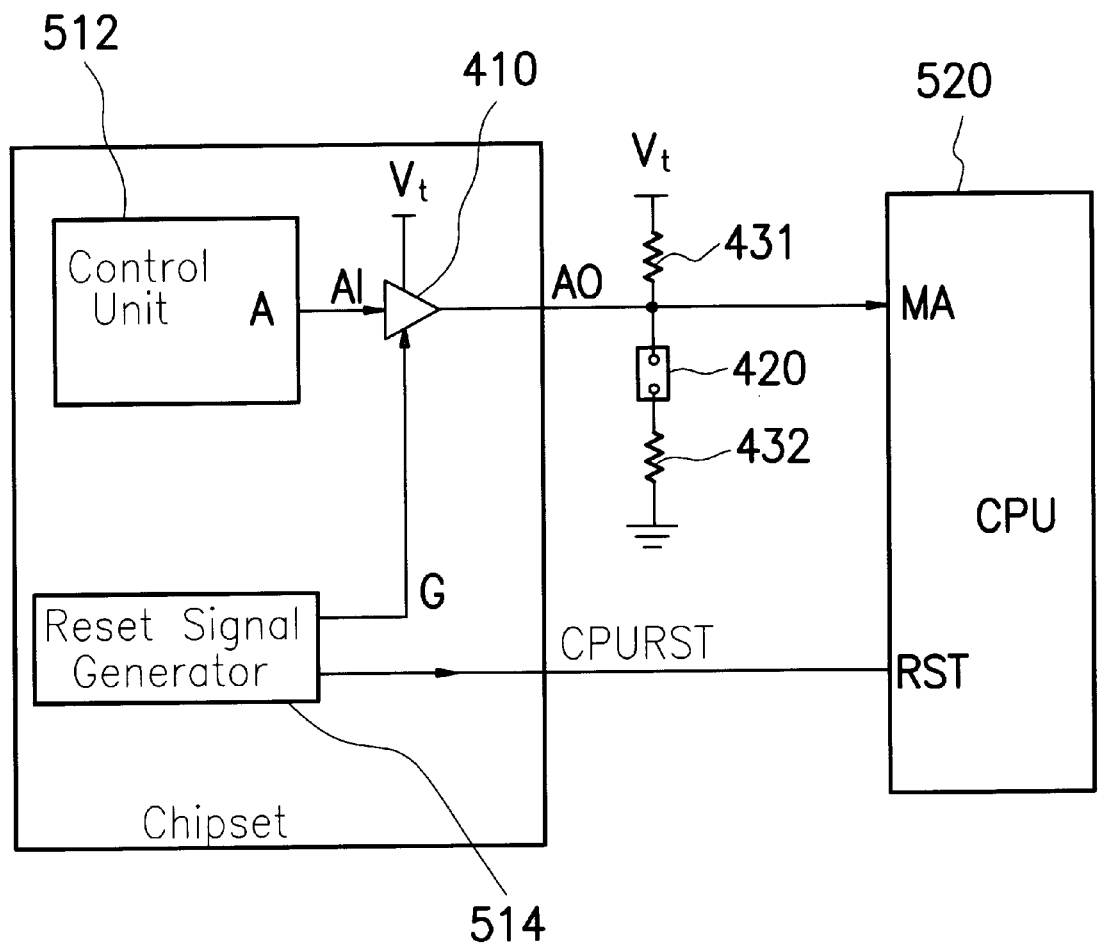
FIG. 5 is a schematic diagram showing the connection of the setting/driving circuit of the invention between a chip set and a CPU.

FIG. 5 is a schematic diagram showing the connection of the setting/driving circuit of FIG. 4 between a chip set 510 and a CPU 520. The chip set 510 includes a control unit 512 and a reset signal generator 514.

Figure 1:
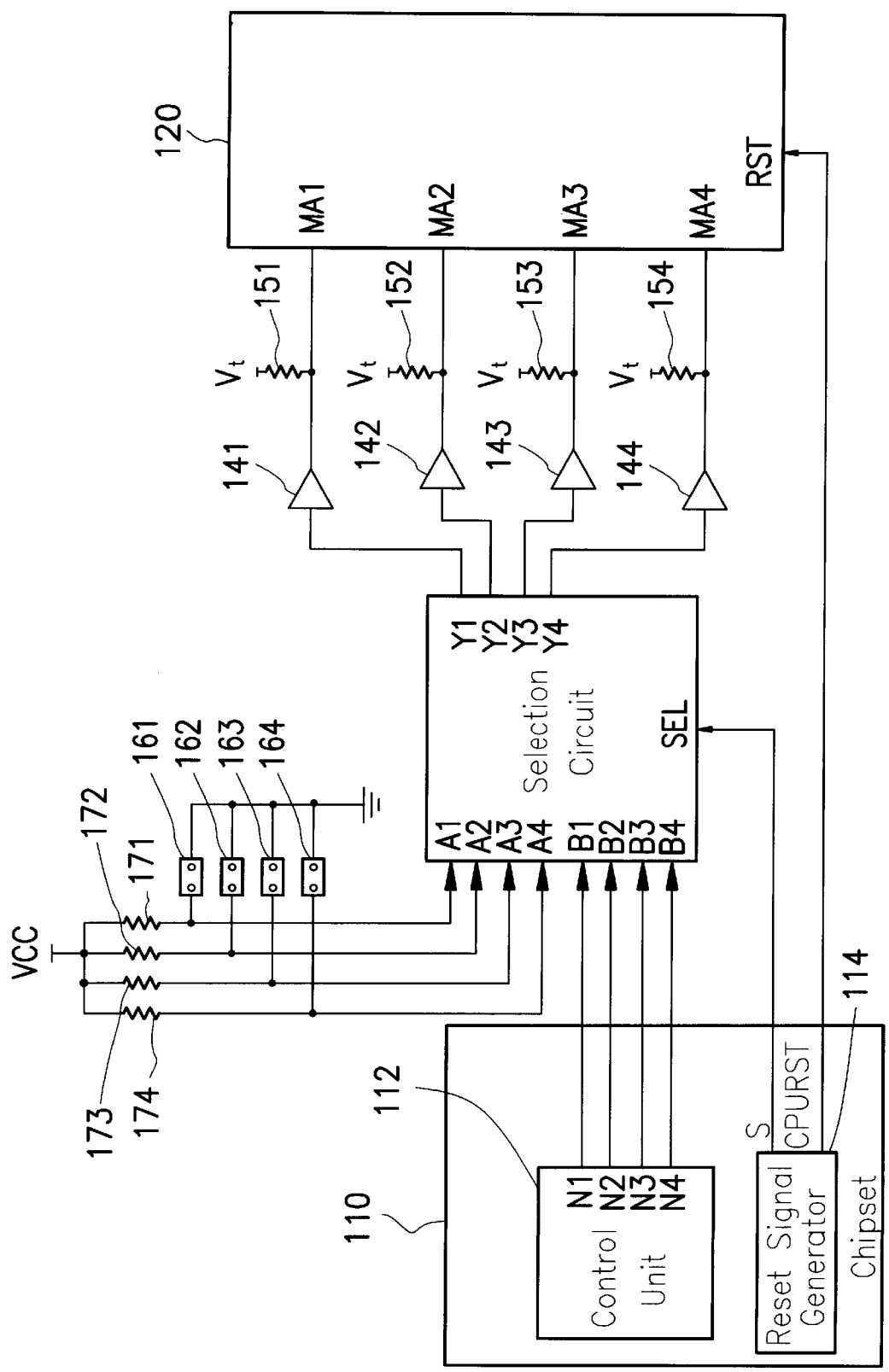
FIG. 1 is a schematic diagram showing the use of a conventional setting/driving circuit in conjunction with a chip set and a CPU having a set of multi-function pins.
Figure 2:
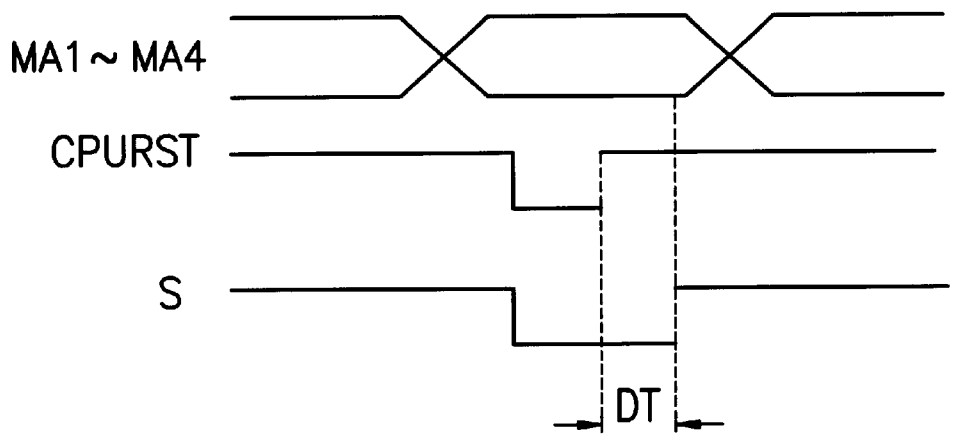
FIG. 2 is a waveform diagram showing the timing relationships between a reset signal and a selection signal generated by the reset signal generator shown in FIG. 1.
Figure 3:
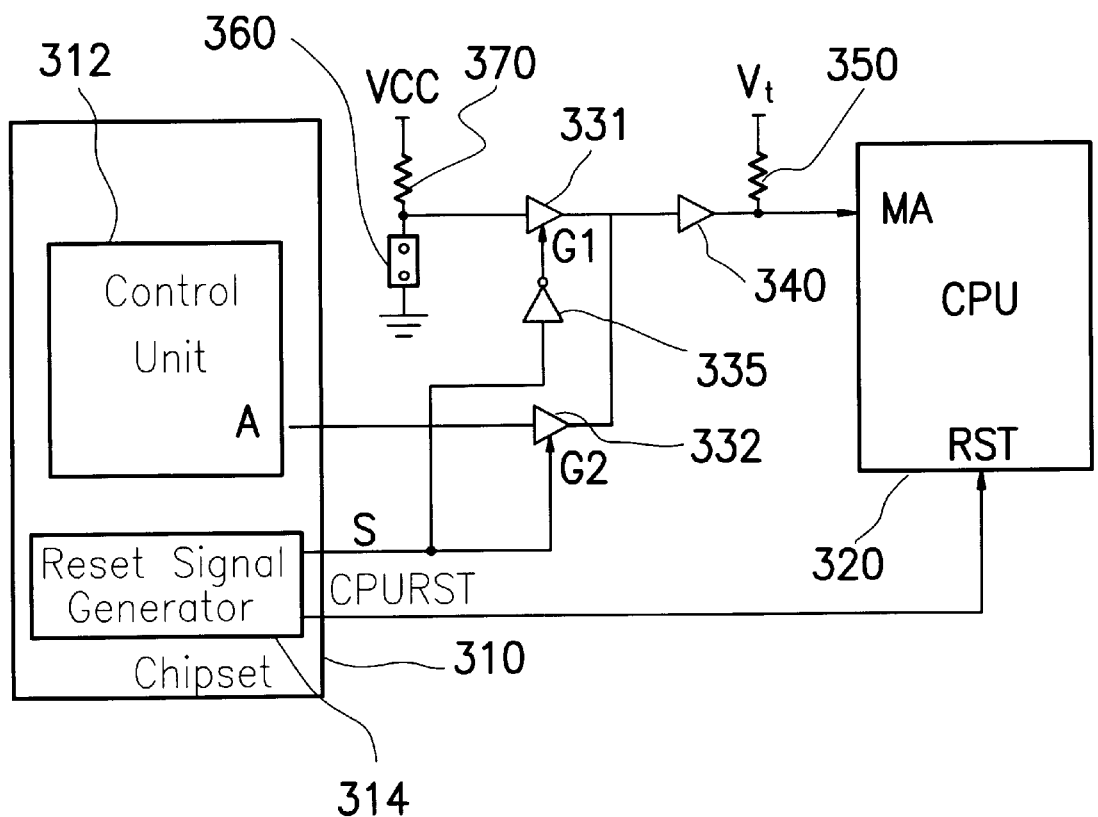
FIG. 3 is a schematic diagram showing a simplified representation of the system of FIG. 1 and is used to depict the operation of the conventional setting/driving circuit.

Both the chip set 510 and the CPU 520 are substantially identical in architecture and functionality as those shown in FIGS. 1 and 3, except that the tri-state buffer 410 of the setting/driving circuit of the invention is here integrated within the chip set 510. The tri-state buffer 410 is connected in such a manner that its input port AI is connected to the control data output port of the control unit 512, its control port G is connected to the S output port of the reset signal generator 514, and its output port AO is connected to one output pin of the chip set 510. By comparing FIG. 5 with FIG. 3, it can be seen that the chip set 510 here requires a reduced number of pins.

Since the switch 420, the first resistor 431, and the second resistor 432 are not integral parts of any IC units, they are mounted as individual circuit elements on the motherboard, with the node between the first resistor 431 and the switch 420 (i.e., the output of the setting/driving circuit) being connected directly to the multi-function pin MA of the CPU 520. Compared to the prior art in which many individual circuit components are mounted on the motherboard, the motherboard utilizing the setting/driving circuit of the invention is undoubtedly more simplified in circuit complexity and is thus easier to assemble than the prior art.

As mentioned in the background section of this specification, the multi-function pin MA is switched to the parameter data receiving mode only during the initialization of the CPU 520, and is thereafter switched to the control data receiving mode. The CPU 520 is reset each time the power of the computer is turned on, or when the user resets the computer by pressing a reset button on the computer. This causes the reset signal generator 514 in the chip set 510 to set the CPURST output pin to a high-voltage logic state, which is then transferred to the RST input pin of the CPU 520.

Concurrently, the reset signal generator 514 sets the S output port to a low-voltage logic signal, which is then transferred to the control port G of the tri-state buffer 410, thereby disabling the tri-state buffer 410, causing the output port AO of the tri-state buffer 410 to be put into a high-impedance state. This allows the parameter data set by the switch 420 to be input to the CPU 520 via the multi-function pin MA. The low-voltage logic state at the control port G of the tri-state buffer 410 should comply with the timing relationship mentioned earlier (shown in FIG. 3) and remain for a predetermined delay time, for example, two cycles of the external clock rate, after the reset signal is switched back to the high-voltage logic state so as to assure that the parameter data are faithfully received by the CPU 520. When the selection signal is switched to high-voltage logic state, it causes the tri-state buffer 410 to be enabled, thus allowing the output port AO to take on the input port AI to transfer the control data from the control unit 512 to the multi-function pin MA of the CPU 520.

In conclusion, the invention provides a setting/driving circuit whose driving unit can be integrated into the chip set without having to increase the total number of pins on the chip set. The result is that the layout complexity on the motherboard can be simpler than that of the prior art. Therefore, the setting/driving circuit of the invention is easier and more cost-effective to implement on a computer motherboard than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A setting/driving circuit for use in conjunction with an IC logic unit having at least one multi-function pin to provide a first set of data and a second set of data selectively via the multi-function pin to the IC logic unit, the IC logic unit having a preset threshold voltage to distinguish various voltage states between two values of binary logic data, with the multi-function pin being used to selectively receive the first set of data or the second set of data;

the setting/driving circuit comprising:
a buffer having an input port connected to receive the second set of data, an output port connected to the multi-function pin of the IC logic unit, and a control port used to receive a selection signal, the buffer operating in such a manner that
when the selection signal is at an enable state, the buffer is enabled to cause the voltage state at the output port thereof to take on the voltage state at the input port thereof; and
when the selection signal is at a disable state, the buffer is disabled to cause the output port thereof to be put into a high-impedance state;
a voltage source supplying a system voltage representing a high-voltage logic state, the system voltage being higher in magnitude than the threshold voltage of the IC logic unit;
a first resistor having a first end connected to the system voltage and a second end connected to the output port of the buffer;
a second resistor having a first end connected to the ground and a second end connected to a node, the first and second resistors being set to such resistance values that allow them to divide the system voltage into a level lower than the threshold voltage of the IC logic unit to represent a low-voltage logic state; and
a switch having a first end connected to the output port of the buffer and a second end connected to the node connected to the second resistor;
wherein
when the selection signal is switched to a disable state, the buffer is disabled to cause the output port thereof to be put into a high-impedance state, allowing the first set of data set by the switch to be transferred to the multi-function pin of the IC logic unit; and
when the selection signal is switched to an enable state, the buffer is enabled to cause the output port thereof to take on the second set of data input to the input port thereof, allowing the second set of data to be transferred to the multi-function pin of the IC logic unit.

2. The setting/driving circuit of claim 1, wherein the first and second resistors are set to such resistance values as to allow the buffer to operate in the output driving range.

3. The setting/driving circuit of claim 1, wherein the switch is a jumper.

4. A setting/driving circuit for use in conjunction with a CPU having at least one multi-function pin to provide a set of specified parameter data or a set of control data via the multi-function pin to the CPU, the CPU being mounted in conjunction with a chip set on a computer motherboard, with the chip set including a control unit for generating the control data to the CPU and a reset signal generator for generating a selection signal to select between the transfer of the parameter data and the transfer of the control data to the CPU, the CPU having a preset threshold voltage to distinguish various voltage states between two values of binary logic data, with the multi-function pin being used to selectively receive the parameter data from the setting/driving circuit or the control data from the control unit, the setting/driving circuit comprising:
a tri-state buffer having an input port connected to receive the control data, an output port connected to the multi-function pin of the CPU, and a control port used to receive the selection signal from the reset signal generator; the tri-state buffer operating in such a manner that
when the selection signal is at an enable state, the tri-state buffer is enabled to cause the voltage state at the output port thereof to take on the voltage state at the input port thereof; and
when the selection signal is at a disable state, the tri-state buffer is disabled to cause the output port thereof to be put into a high-impedance state;
a voltage source supplying a system voltage representing a high-voltage logic state, the system voltage being higher in magnitude than the threshold voltage of the CPU;
a first resistor having a first end connected to the system voltage and a second end connected to the output port of the tri-state buffer;
a second resistor having a first end connected to the ground and a second end connected to a node, the first and second resistors being set to such resistance values that allow them to divide the system voltage into a level lower than the threshold voltage of the CPU to represent a low-voltage logic state; and
a switch having a first end connected to the output port of the tri-state buffer and a second end connected to the node which is connected to the second resistor;
wherein
when the selection signal is switched to a disable state, the tri-state buffer is disabled to cause the output port thereof to be put into a high-impedance state, allowing the parameter data set by the switch to be transferred to the multi-function pins of the CPU; and
when the selection signal is switched to an enable state, the tri-state buffer is enabled to cause the output port thereof to take on the control data input at the input port thereof, allowing the control data from the control unit to be transferred to the multi-function pin of the CPU.

5. The setting/driving circuit of claim 4, wherein the tri-state buffer is integrated within the chip set.

6. The setting/driving circuit of claim 4, wherein the reset signal generator is further capable of generating a reset signal which can reset the CPU when the reset signal is switched to a first logic state, during which time the multi-function pin is set to receive the parameter data set by the switch to allow the CPU to operate according to the received parameter data when the reset signal is switched to a second logic state.

7. The setting/driving circuit of claim 6, wherein the reset signal and the selection signal are synchronized in such a manner that they are concurrently switched to the first logic state when the CPU is reset, and after the reset signal is switched to the second logic state, the selection signal remains in the first logic state for a predetermined delay time to allow the CPU to receive the parameter data set by the switch.

8. The setting/driving circuit of claim 4, wherein the first and second resistors are set to such resistance values as to allow the tri-state buffer to operate in the driving range.

9. The setting/driving circuit of claim 4, wherein the switch is a jumper.

* * * * *